(12) United States Patent
Riedel et al.

(10) Patent No.: US 8,485,486 B2
(45) Date of Patent: Jul. 16, 2013

(54) MOUNTING DEVICE FOR A RETRACTABLE DISPLAY

(75) Inventors: Christian Riedel, Bliedersdorf (DE); Guenter Schmitz, Jesteburg (DE)

(73) Assignee: Airbus Operations GmbH, Hamburg (DE)

( * ) Notice: Subject to any disclaimer, the term of this patent is extended or adjusted under 35 U.S.C. 154(b) by 304 days.

(21) Appl. No.: 12/959,923

(22) Filed: Dec. 3, 2010

(65) Prior Publication Data

US 2011/0133028 A1  Jun. 9, 2011

Related U.S. Application Data

(60) Provisional application No. 61/266,682, filed on Dec. 4, 2009.

(30) Foreign Application Priority Data

Dec. 4, 2009 (DE) .......................... 10 2009 057 017

(51) Int. Cl.
*F16M 11/10* (2006.01)

(52) U.S. Cl.
USPC ........ 248/317; 244/118.5; 248/320; 248/343; 248/917; 297/217.4; 297/217.5; 297/217.3; 361/7

(58) Field of Classification Search
USPC ................... 244/118.5, 129.1; 248/917, 320, 248/343, 297.21, 292.12, 317, 918–924; 312/7.2; 297/217.4, 217.3; 361/7
See application file for complete search history.

(56) References Cited

U.S. PATENT DOCUMENTS

| | | | | |
|---|---|---|---|---|
| 2,378,043 A * | 6/1945 | Sorensen et al. | ................ | 29/464 |
| 5,096,271 A * | 3/1992 | Portman | ........................ | 312/7.2 |
| 5,145,128 A * | 9/1992 | Umeda | ...................... | 244/118.5 |
| 5,320,494 A * | 6/1994 | Reinfelder et al. | ........... | 416/226 |
| 5,467,106 A * | 11/1995 | Salomon | ......................... | 345/87 |
| 5,583,735 A * | 12/1996 | Pease et al. | ................... | 361/170 |
| 6,011,685 A * | 1/2000 | Otsuki | .................... | 361/679.01 |
| 6,012,785 A * | 1/2000 | Kawasaki | ....................... | 312/29 |
| 6,157,418 A * | 12/2000 | Rosen | .......................... | 348/837 |
| 6,256,078 B1 * | 7/2001 | Ogata | ............................ | 349/58 |
| D446,507 S * | 8/2001 | Rosen et al. | ................. | D14/132 |
| 6,366,451 B1 * | 4/2002 | Smock et al. | ............ | 361/679.22 |
| 6,412,848 B1 * | 7/2002 | Ceccanese et al. | .......... | 296/37.7 |
| 6,445,573 B1 * | 9/2002 | Portman et al. | ......... | 361/679.27 |
| 6,476,879 B1 * | 11/2002 | Ho et al. | ....................... | 348/837 |
| D469,068 S * | 1/2003 | Furusawa | ..................... | D14/132 |

(Continued)

FOREIGN PATENT DOCUMENTS

| | | |
|---|---|---|
| DE | 1 993 8690 A1 | 2/2001 |
| DE | 20 2005 011 347 U1 | 9/2005 |
| DE | 10 2007 025 881 A1 | 12/2008 |

*Primary Examiner* — Isam Alsomiri
*Assistant Examiner* — Assres H Woldemaryam
(74) *Attorney, Agent, or Firm* — Ingrassia Fisher & Lorenz P.C.

(57) ABSTRACT

A display mount is provided for a vehicle, such an aircraft. The display mount includes, but is not limited to a support frame and a display accommodation device. The support frame is designed for incorporation in a supply channel, and the display accommodation device is designed to receive a display. The display accommodation device is connected to the support frame such that the display accommodation device is movable with a combined rotational movement and translational movement relative to the support frame between a first operating position and a second operating position.

15 Claims, 4 Drawing Sheets

U.S. PATENT DOCUMENTS

| | | | |
|---|---|---|---|
| 6,557,812 B2 * | 5/2003 | Kutzehr et al. | 248/476 |
| 7,124,989 B1 * | 10/2006 | Lee et al. | 248/288.11 |
| 7,405,773 B2 * | 7/2008 | Lester et al. | 348/825 |
| 7,448,679 B2 * | 11/2008 | Chang | 297/217.3 |
| 7,639,477 B2 * | 12/2009 | Ikunami | 361/679.01 |
| 7,847,794 B2 * | 12/2010 | Choi | 345/204 |
| 7,869,129 B2 * | 1/2011 | Lebreton | 359/632 |
| 8,159,623 B2 * | 4/2012 | Strohmaier et al. | 348/836 |
| 2002/0021279 A1 * | 2/2002 | Nakasuna | 345/156 |
| 2004/0075639 A1 * | 4/2004 | Lester et al. | 345/156 |
| 2004/0189881 A1 * | 9/2004 | Cook et al. | 348/837 |
| 2006/0164230 A1 * | 7/2006 | DeWind et al. | 340/461 |
| 2007/0247792 A1 * | 10/2007 | Yang | 361/681 |
| 2008/0100548 A1 * | 5/2008 | Choi | 345/87 |
| 2009/0200425 A1 * | 8/2009 | Kallinen et al. | 244/131 |

* cited by examiner

MOUNTING DEVICE FOR A RETRACTABLE DISPLAY

REFERENCE TO RELATED APPLICATIONS

This application claims the benefit of the filing date of and priority to U.S. Provisional Patent Application No. 61/266,682, filed on Dec. 4, 2009 and of German Patent Application No. 10 2009 057 017.9, filed on Dec. 4, 2009, the disclosures of which applications are hereby herein incorporated by reference in their entirety.

TECHNICAL FIELD

The technical field relates to a mounting device for a retractable display and a display surface, and in particular to a mounting device for a retractable display or a display projection area for an aircraft with an overhead display arrangement.

BACKGROUND

In means of transportation for a larger number of passengers, frequently, for the purpose of entertainment and information, displays are arranged and provided which are either provided for each passenger individually or for a larger number of passengers. Such displays are frequently arranged overhead in supply channels from which these displays can be extended when in use, in order to allow viewing according to their intended purpose. When such displays are not in use, the displays are retracted into corresponding spaces in the supply channel, for example so as to prevent the hindering of passengers during boarding and deboarding.

In the past such displays were frequently mounted in the overhead supply channel in a foldable manner with a folding mechanism so that, when in use, the displays can be folded out on a rotary axis from an accommodating recess. In this arrangement, in the retracted state the actual display area as a rule points upwards so that in the retracted state the display area is no longer visible to the passenger.

Other mechanisms provide, for example, for a display to be pushed into the supply channel by means of a translational, i.e., sliding, movement so that the display completely disappears in the supply channel when it is not used. However, such an arrangement uses a comparatively substantial installation depth in the supply channel, which installation depth essentially corresponds to the dimensions of the display in the direction of push-in.

SUMMARY

In view of the foregoing, embodiments of the invention provide for a display or a display mounting that makes it possible with little spatial use to use the display for a further application even in an at least partly retracted position.

According to an exemplary embodiment, a display mount for an aircraft is provided, comprising a support frame and a display accommodation. The support frame is designed for incorporation in a supply channel or some other console in an aircraft. The display accommodation device is designed to receive a display, and the display accommodation device is connected to the support frame in such a manner that the display accommodation device is movable by means of a combined rotational movement and translational movement relative to the support frame between a first operating position and a second operating position.

By providing a combined rotational movement and translational movement it may be possible to vary the inclination of the display while also providing for the option of pulling or pushing a display only partly into an accommodation recess of a supply channel. This makes it possible to use the display area even in a pulled-in state at least in part for further applications, for example to provide boarding information to a passenger.

In contrast to the retractable displays known from the state of the art, it may be thus possible to use the display for further display purposes even in a partly retracted or fully retracted position. On the other hand, in contrast to the display solutions from the state of the art, which can be pushed into a supply channel, the installation depth in the supply channel is reduced. In this manner a display mount, a display and display device is provided that at the same time ensures partial visibility of the display, while comprising a minor installation depth. Instead of a display it is also possible to provide a display projection surface, in particular if the information to be presented is projected. A support frame that carries the display accommodation device can, for example, be installed in a supply channel, or, for example, in entrance regions or lounges of an aircraft. Of course, installation is also possible in other means of transport, for example in motor vehicles such as passenger motor vehicles, buses, ships, boats or trains.

According to a further exemplary embodiment, a display mount for an aircraft is provided. The support frame comprises a cover region, and the display accommodation device is arranged in such a manner that a display accommodated in the display accommodation in the first operating position is covered in a first display region by the cover region while in the second operating position it is not covered by the cover region. A display accommodated in the display accommodation device in a second display region is visible in the first operating position and in the second operating position.

This means, for example, that a display that is provided in the display accommodation in a first operating position, for example during boarding or deboarding, is arranged in such a way that it is at least partly covered, and that thus part of the display region is invisible to the passenger. However, in this position the remaining part of the display can be used for further display purposes. This region, which in the first position is covered, is then in the second operating position, for example, when viewing films during a journey, not covered by the cover region, and consequently a substantial region of the display or the entire display is visible to the passenger. In the display region that remains visible also in a first position, for example in the retracted state, it is thus possible to display status information, for example a "fasten seat belts" sign or safety information. Furthermore, in this region of the display it is also possible to provide touch-sensitive regions by which switch functions can be implemented, for example in order to contact the cabin crew or in order to set individual comfort functions, for example ventilation or illumination.

According to a further exemplary embodiment, the support frame comprises a first guide track, and the display accommodation device comprises a first guide element that is guidable along the first guide track. In this manner the display accommodation device may be guided relative to the support frame, and by the design of the guide track and of the guide element the movement sequence of the combined rotational movement and translational movement can be predetermined. In this arrangement the guide track can, for example, be provided in the form of a groove or a slot, while the guide element may be implemented in the form of a pin or the end of a pin. However, the guide element may equally be an element elongated along the direction of the guide track, and in this manner by the first guide track and the first guide element determine not only the position but also the inclination of the display relative to the support frame.

According to an exemplary embodiment, the display accommodation device comprises a second guide track, and the support frame comprises a second guide element that is guidable along the second guide track. By the second guide track and the second guide element it is possible to achieve defined guidance and inclination of the display accommodation device relative to the support frame. The arrangement of the second guide track on the display accommodation device makes possible a space-saving arrangement of the guide tracks, which is significant in aircraft construction. However, it is also possible to provide both the first guide track and the second guide track in the support frame, and to provide in the display accommodation device the first guide element and the second guide element. Furthermore, it is also possible to provide both the first and the second guide track at the display accommodation device, and to provide the first and the second guide element at the support frame.

According to an exemplary embodiment, the first guide track is straight. In this manner it is possible to pull the display mounting device at various depths straight into the support frame in order to in this manner be able to provide a variable display area that remains free. Furthermore, straight moving of the display accommodation device into the support frame reduces the necessary slot width between the support frame and the display accommodation device, so that it is essentially possible to prevent slots arising between the display and the cover, into which slots objects could be inserted inadvertently or intentionally, which objects can affect operation of the device.

According to a further exemplary embodiment, the combined rotational movement and translational movement comprises sequential stringing-together of a rotational movement and a translational movement. In this way it is possible to effect first a translational movement and subsequently a rotational movement or vice versa. In particular in the case of extending the display accommodation device from the support frame, a translational movement can be carried out in order to, as described above, keep to a minimum a slot or an opening between the supply channel, in particular of a cover, and a display provided in the display accommodation device. After complete extension, i.e., after completion of a translational movement, a rotational movement may then take place that furthermore makes it possible to vary the inclination of the display. This may take place, for example, in order to provide to the passenger an optimal viewing angle relative to the display. Such a viewing angle may, for example, also be designed so as to be variable by the passenger because the optimum viewing angle can, for example, change depending on the stature or on the posture of the seated passenger. This may, for example, take place by touch-sensitive regions with a switch-function in a region of a display incorporated in the display accommodation device.

According to a further exemplary embodiment, a display mount for an aircraft is provided. The second guide track comprises a straight section and a circle-segment-shaped section, the first guide track and the second guide track are arranged relative to each other in such a manner that for the translational movement the first guide element is movable along the first guide track, and the second guide element is moveable along the straight section of the second guide track. The rotational movement the first guide element is not movable along the first guide track, and the second guide element is movable along the circle-segment-shaped section of the second guide track.

In this manner a translational movement, in particular during extension of the display accommodation device from the support frame, with guidance without any jamming may be achieved by two guide tracks which for translational movement in this region are both straight. For subsequent rotational movement the first guide element may then remain stationary in the first guide track, while the second guide element may be guided in the circle-segment-shaped section of the second guide track in such a manner that the display accommodation device relative to the support frame rotates on the first guide element in order to in this manner be able to vary the inclination of the display mounting device and any display contained therein.

Driving the display accommodation device relative to the support frame may, for example, take place by a spindle drive that acts on a corresponding point of action on the display accommodation device, and in this manner both in the region of the rotational movement and in the region of the translational movement moves the display accommodation device relative to the support frame. As an alternative, for example, any other drive that is in a position to move the display accommodation device relative to the support frame is also imaginable. The above may, for example, also be effected by a gearwheel drive which, for example, provides for a gearwheel on the second guide element, which gearwheel engages the second guide track along a row of teeth, and in this manner implements a corresponding rotational movement or translational movement of the display accommodation device relative to the support frame.

According to a further exemplary embodiment, the first operating position is in the region of the translational movement, and the second operating position is in the region of the rotational movement. In particular, in the second operational position, i.e., the fully extended state, by the rotational movement the inclination of a display contained in the display accommodation device may be changed in such a manner that it is adjusted to an optimum viewer position of the passenger.

According to a further exemplary embodiment, the display mount further comprises a display. The display is arranged on or in the display accommodation device.

According to a further exemplary embodiment, an aircraft with the display mount described above is provided.

It should be pointed out that individual features can of course also be combined, as a result of which, in part, advantageous effects may arise which exceed the sum of the individual effects. These and other aspects of the present invention are explained and clarified with reference to the exemplary embodiments described below.

BRIEF DESCRIPTION OF THE DRAWINGS

The present invention will hereinafter be described in conjunction with the following drawing figures, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
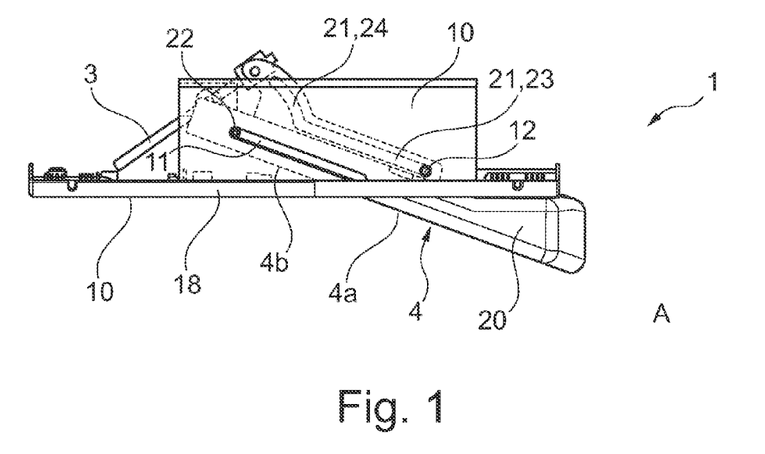
FIG. 1 shows a display mount according to an exemplary embodiment with a display accommodation device which is in a first operating position relative to a support frame.

FIG. 1 shows an exemplary embodiment in which a display mount 1 is provided that comprises a support frame 10 and a display accommodation device 20. In the embodiment shown in FIG. 1 the display accommodation device 20 is in a first operating position or in a first operating state A relative to the support frame 10.

In this operating state the display accommodation device 20 is slid into the support frame 10 in such a manner that part 4b of the display surface or of a display projection area 4a, 4b is covered by a cover 18 in such a manner that a passenger may no longer see this part 4b of the display surface. However, another part of the display surface 4a continues to be in a position visible to the passenger so that information may be continued to be displayed although the display accommodation device 20 is in a retracted state in the support frame 10.

In the embodiment shown in FIG. 1 the support frame 10 comprises a first guide track 11, which in the present embodiment is designed in the form of a straight slot. Within this slot 11 a first guide element 22 is guided which is associated with the display accommodation device 20. Furthermore, the display accommodation device 20 comprises a second guide track 21, which in the exemplary embodiment shown is designed in the form of a slot. In the second guide track 21 of the display accommodation device 20 a second guide element 12 is guided that is associated with the support frame 10. In the exemplary embodiment shown, the guide elements 22, 12 are designed in the form of pins or rods. In the embodiment shown, the second guide track 21 of the display accommodation device 20 comprises two sections.

A first section 23 is straight and a second section 24 essentially comprises a circle-segment shape. The second section may also differ from a circle-segment shape and can comprise some other curved shape. In this case the first guide element 22 moves in the first guide track 11, while the second guide element 12 moves in the section 24, which is not circle-segment shaped, of the second guide track 21.

The lateral view of this arrangement, which lateral view is shown in FIG. 1, is to be interpreted in such a manner that on an opposite side (not visible in the drawing) an analogous arrangement of guide tracks or slots and guide elements can be provided which make it possible to guide the display accommodation device 20 relative to the support frame 10.

Figure 2:
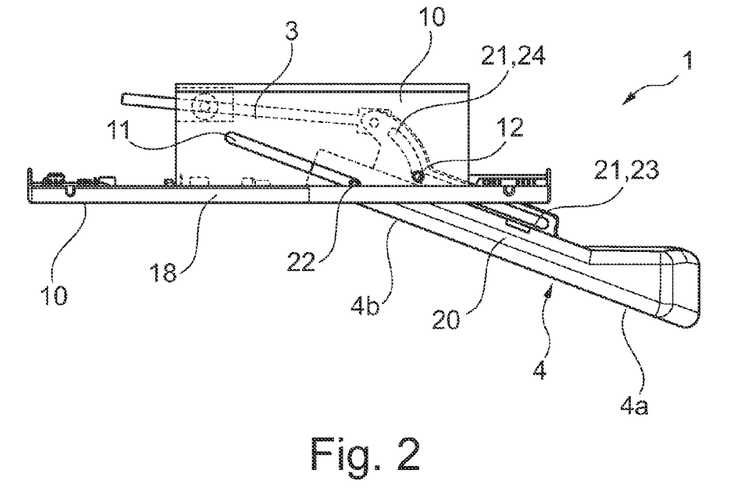
FIG. 2 shows an exemplary embodiment in which the display accommodation device is in a second operating position relative to the support frame.

FIG. 2 also shows a lateral view of a display mount analogous to the illustration of FIG. 1. In contrast to FIG. 1, the display accommodation device 20 of the display mounting device 1 is in a second operating position or a second operating state B relative to the support frame 10. In this operating state the display accommodation device 20 is pulled out from the support frame 10.

To achieve this pulling-out, the display accommodation device 20 is guided along the guide track 11 provided in the support frame, and along the guide element 22 provided on the display accommodation device 20. Analogously, guidance takes place by the second guide track 21 and the second guide element 12. In this first movement section, which essentially represents a translational movement, the guide elements 12, 22 are guided in a linear region of the guide slots 11, 21. In this manner the display accommodation device 20 may be pulled or pushed from the support frame 10 to such an extent that in the embodiment presently shown the entire display surface 4a, 4b of a display 4 accommodated by the display accommodation device 20 is visible to the passenger, rather than being covered by the cover 18.

As a result of this flat-sloping direction of extension the display accommodation device 20 with only a minor installation depth may be slid into the support frame 10 in a first operating state A. However, in the position of the display accommodation device 20, which position is shown in FIG. 2, the viewing angle for a passenger onto the display surface is unfavourable so that while rudimentary icons, for example a "fasten seat belts" sign or a "no-smoking" sign may be perceived by the passenger, comfortable viewing, for example of a video film, may not be possible.

For this reason, from the position shown in FIG. 2 the display accommodation device 20 may be rotated on the guide element 22. During this rotation the second guide element 12 is guided in a circle-segment-shaped section 24 of the guide track 21 of the display accommodation device 20. Thus, the display accommodation device 20 shown in FIG. 2 may be tilted in such a manner that it reaches a position which essentially corresponds to that in the arrangement shown in FIG. 3.

Figure 3:
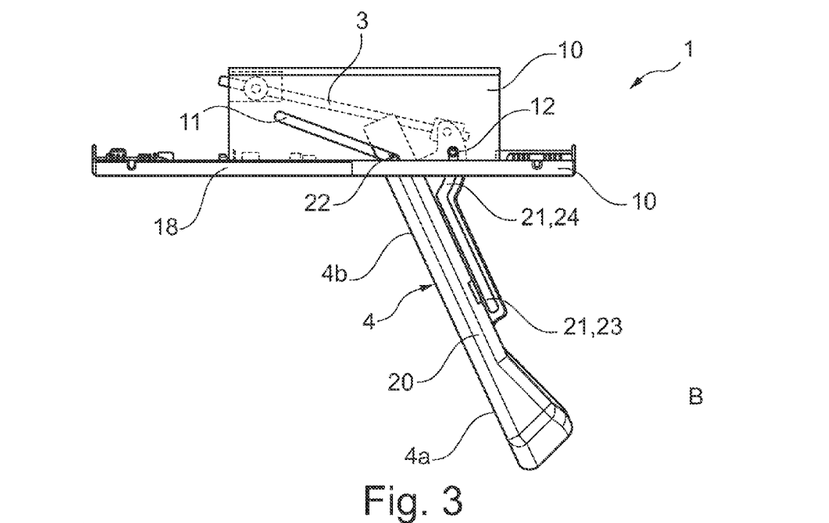
FIG. 3 shows an exemplary embodiment in which the display accommodation device is also in a second operating position relative to the support frame, but at greater inclination than that shown in FIG. 2.

In this arrangement of FIG. 3, which is also shown in lateral view, the first guide element 22 has stayed stationary relative to the guide track 11 of the support frame 10. The display accommodation device 20 has rotated on a rotary axis marked by the guide element 22. The second guide element 12, which is associated with the support frame 10, has moved in the circle-segment-shaped section 24 relative to the second guide track 21. In this manner, guided by the guide elements 12, 22, a rotational movement of the display accommodation device 20 may be achieved so that a passenger may obtain an optimum viewing position relative to the display surface 4a, 4b. Analogously, the display accommodation device 20 may be rotated back in order to, by the intermediate state shown in FIG. 2, return to the slid-in state shown in FIG. 1.

Figure 4:
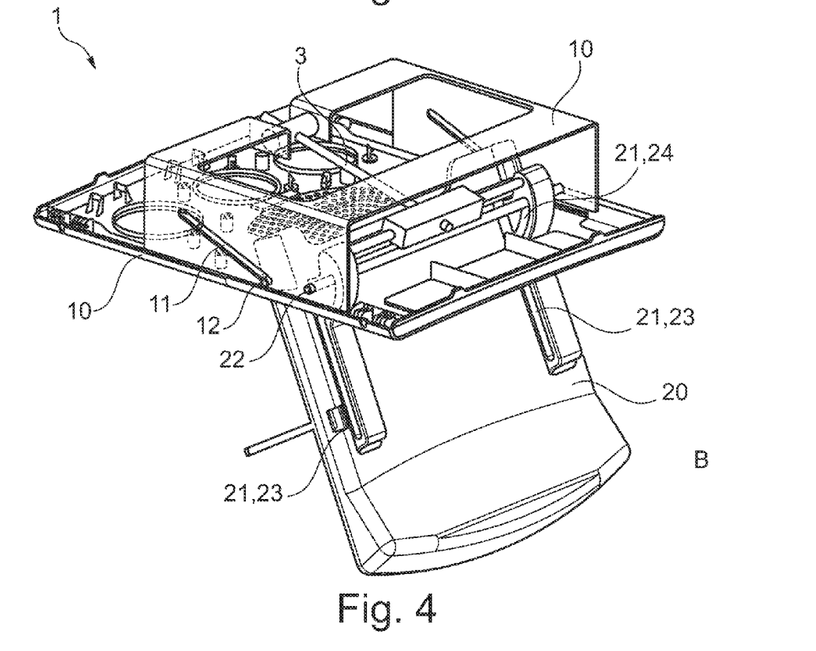
FIG. 4 shows a spatial view of a display mount according to an exemplary embodiment in a second operating position of the display mount relative to the support frame.

FIG. 4 shows a perspective view of the display mounting device 1 with the display accommodation device 20 and the support frame 10. FIG. 4 shows that the guide tracks or slots 11, 21, 23, 24 may be provided on both sides in order to achieve stable guidance of the display accommodation device 20. In the embodiment shown the guide elements 12, 22 may be provided in the form of through-rods. Analogously, the guide elements can, however, be designed as pins that are guided in the corresponding guide tracks or slots 11, 21, 23, 24.

The display accommodation device 20 may be moved relative to the support frame 10, for example by a spindle drive by whose spindle 3 the display accommodation device 20 may be displaced from the first operating position or the first operating state A to the second operating position or the second operating state B, or vice versa. Therein, the support frame can also comprise a supply channel cover, which is, for example, incorporated in the static load capacity of the support frame 10.

Figure 5:
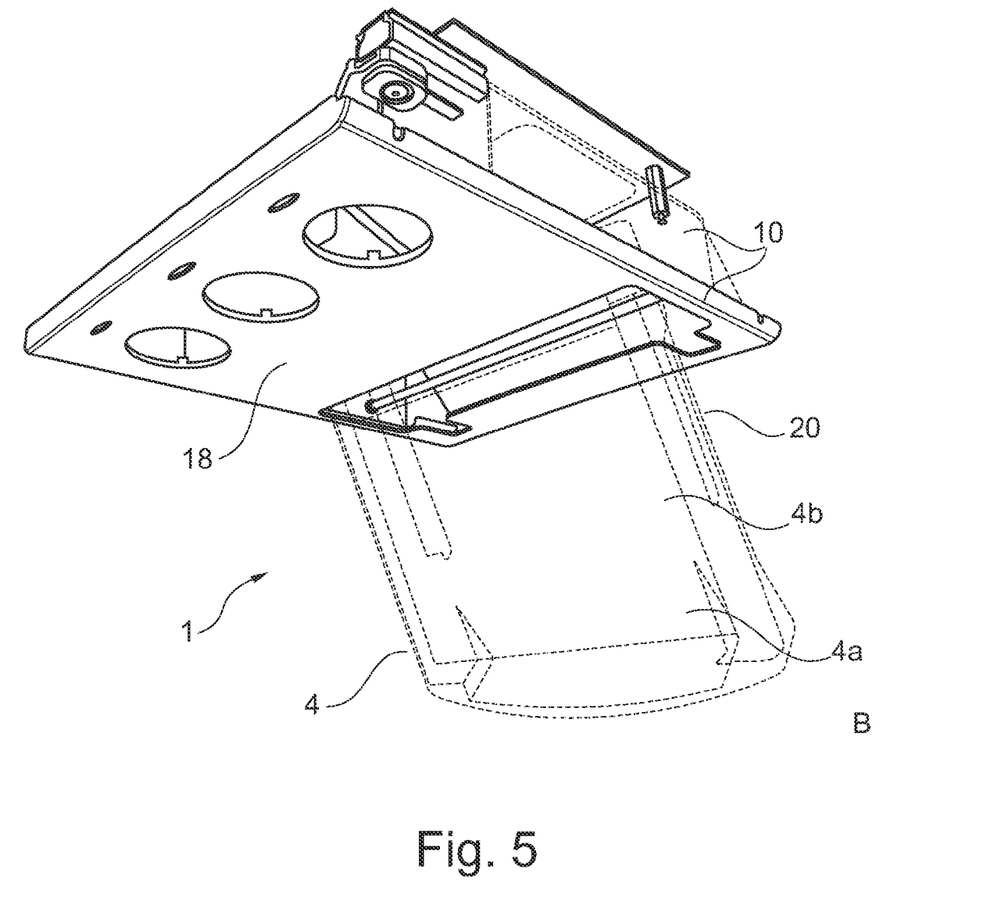
FIG. 5 shows a further exemplary embodiment of the display mount in a second operating position, but from a viewer position that differs from that shown in FIG. 4.

FIG. 5 shows a further exemplary embodiment, in which the display mounting device 1 is shown from another perspective that rather corresponds to the viewing position of a passenger. In this arrangement the display accommodation device 20 is in the second operating state B, in which, in the embodiment shown, the display surface 4b is visible to the passenger, which display surface 4b in the operating state A is covered by the cover 18, and the display surface 4a is visible, which also in the retracted state is visible to the passenger. In this way it is possible, for example during playback of a film, to use the entire display surface 4a and 4b, in particular if the display accommodation device 20 is in the second operating state B as shown in FIG. 5, and it is further possible to reproduce information icons in the display surface 4a of the display when said display is in its retracted state and the display surface 4b is covered by the cover 18.

Figure 6:
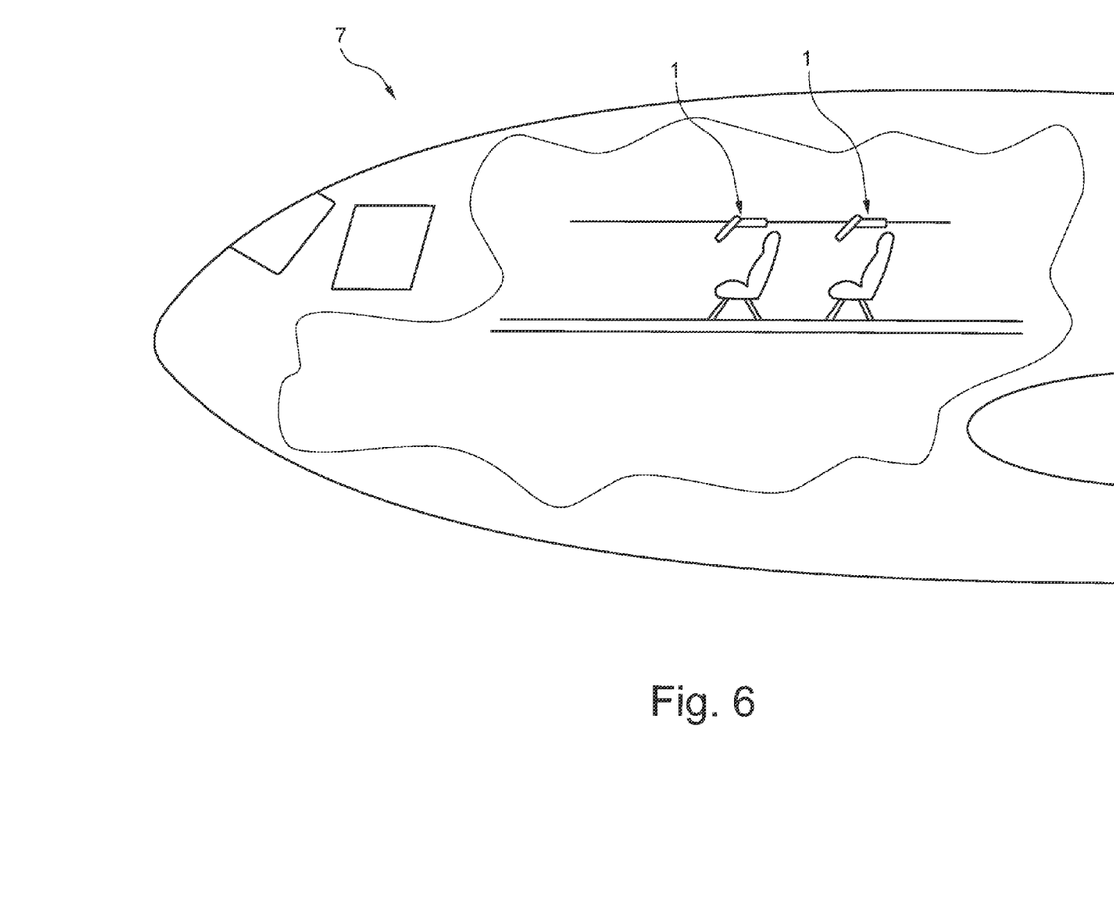
FIG. 6 shows a schematic view of an aircraft with an installation position of a display mount according to an embodiment.

FIG. 6 shows a schematic view of an aircraft 7 with display mounting devices 1 that are arranged in the overhead region of a supply channel. It should be noted that this illustration is merely schematic and does not show the only installation configuration of the display mounting device.

It should be noted that the embodiment, apart from its use in aircraft, may also be used in other passenger transportation vehicles, for example in buses, trains, boats or ships. Likewise, the display mounting device according to the embodiments may be arranged in passenger motor vehicles, in particular above the non-driver passenger seats, so that information icons relating, for example, to the fastening of seat belts or particular driving information may be displayed in the first operating position A, while for playback of a film the display accommodation device 20 may be moved to a second operating position B in order to make possible an optimum viewer position for viewing the entire display surface 4a, 4b.

It should also be noted that the term "comprising" does not exclude other elements or method-related steps, and that the term "a" or "an" does not exclude several elements and/or steps. The reference characters used serve only to provide a better understanding; they should in no way be interpreted as limiting. Furthermore, while at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A display mount for a vehicle, comprising:
   a support frame configured for incorporation in a supply channel, the support frame including a first guide track; and
   a display accommodation device connected to the support frame that receives a display, the display accommodation device including a first guide element that is guidable along the first guide track and a second guide track,
   wherein the display accommodation device is connected to the support frame such that the display accommodation device is movable with a combined movement of a rotational movement and a translational movement relative to the support frame between a first operating position and a second operating position,
   wherein the second guide track comprises a substantially straight section and a substantially curved section and the support frame includes a second guide element that is guidable along the second guide track,
   wherein the first guide track is arranged relative to the second guide track such that for the translational movement the first guide element is movable along the first guide track, and the second guide element is moveable along the substantially straight section of the second guide track, and
   wherein for the rotational movement of the first guide element is not movable along the first guide track and the second guide element is movable along the substantially curved section of the second guide track.

2. The display mount according to claim 1, wherein the vehicle is an aircraft.

3. The display mount according to claim 1,
   wherein the support frame comprises a cover region, and
   wherein the display accommodation device is arranged such that the display accommodated in the display accommodation device in a first display region in the first operating position is substantially covered by the cover region.

4. The display mount according to claim 1,
   wherein the support frame comprises a cover region, and
   wherein the display accommodation device is arranged such that the display accommodated in the display accommodation device in the second operating position is substantially uncovered by the cover region.

5. The display mount according to claim 1, wherein the display accommodated in the display accommodation device in a second display region is visible in the first operating position and in the second operating position.

6. The display mount according to claim 1, wherein the first guide track is substantially straight.

7. The display mount according to claim 1, wherein the combined movement is a sequential rotational and translational movement.

8. The display mount according to claim 1, wherein the first operating position is in a first region of the translational movement, and the second operating position is in a second region of the rotational movement.

9. The display mount according to claim 1, wherein the display is arranged on the display accommodation device.

10. An aircraft, comprising:
    a supply channel;
    an overhead region of the supply channel;
    a display mounting device arranged in the overhead region of the supply channel, the display mounting device comprising:
    a support frame configured for incorporation in the supply channel and the support frame includes a first guide track; and
    a display accommodation device connected to the support frame that receives a display, the display accommodation device including a first guide element that is guidable along the first guide track and a second guide track,
    wherein the display accommodation device is connected to the support frame such that the display accommodation device is movable with a combined movement of a rotational movement and a translational movement relative to the support frame between a first operating position and a second operating position,
    wherein the second guide track comprises a substantially straight section and a substantially curved section and the support frame includes a second guide element that is guidable along the second guide track, wherein the first guide track is arranged relative to the second guide track such that for the translational movement the first guide element is movable along the first guide track, and the second guide element is moveable along the substantially straight section of the second guide track, and wherein for the rotational movement of the first guide element is not movable along the first guide track and the second guide element is movable along the substantially curved section of the second guide track.

11. The aircraft according to claim 10, wherein the support frame comprises a cover region, and wherein the display accommodation device is arranged such that the display accommodated in the display accommodation device in a first display region in the first operating position is substantially covered by the cover region.

12. The aircraft according to claim 10, wherein the support frame comprises a cover region, and wherein the display accommodation device is arranged such that the display accommodated in the display accommodation device in the second operating position is substantially uncovered by the cover region.

13. The aircraft according to claim 10, wherein the display accommodated in the display accommodation device in a second display region is visible in the first operating position and in the second operating position.

14. The aircraft according to claim 10, wherein the first guide track is substantially straight.

15. The aircraft according to claim 10, wherein the combined movement is a sequential rotational and translational movement.

* * * * *